(12) United States Patent
Hirschfeld et al.

(10) Patent No.: US 7,819,427 B2
(45) Date of Patent: Oct. 26, 2010

(54) STEERING COLUMN ASSEMBLY

(75) Inventors: Klaus Hirschfeld, Luedenscheid (DE); Michael Langs, Luedenscheid (DE); Lukas Fiala, Luedenscheid (DE); Benno Wessendorf, Luedenscheid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 12/577,818

(22) Filed: Oct. 13, 2009

(65) Prior Publication Data

US 2010/0045013 A1 Feb. 25, 2010

Related U.S. Application Data

(63) Continuation of application No. PCT/EP2008/054939, filed on Apr. 23, 2008.

(30) Foreign Application Priority Data

Apr. 25, 2007 (DE) .................. 10 2007 019 493

(51) Int. Cl.
*B62D 1/16* (2006.01)
(52) U.S. Cl. .................. 280/779; 70/252; 180/287; 180/315; 200/61.54; 307/10.1; 439/15; 74/491
(58) Field of Classification Search .............. 70/185, 70/186, 252; 74/491, 492, 552; 180/78, 180/287, 289, 315; 200/61.27, 61.54; 280/779; 307/10.1–10.3; 439/15, 34
See application file for complete search history.

(56) References Cited

U.S. PATENT DOCUMENTS

| 5,747,763 | A |   | 5/1998  | Uchiyama et al. |          |
|-----------|---|---|---------|-----------------|----------|
| 5,766,019 | A | * | 6/1998  | Matsumoto et al.| 439/15   |
| 5,769,649 | A | * | 6/1998  | Welschholz et al.| 439/164 |
| 5,780,796 | A | * | 7/1998  | Uchiyama et al. | 200/61.54 |
| 5,883,348 | A | * | 3/1999  | Yokoyama        | 200/61.54 |
| 6,403,900 | B2| * | 6/2002  | Hecht et al.    | 200/61.54 |
| 6,492,744 | B1| * | 12/2002 | Rudolph et al.  | 307/10.1 |
| 6,501,033 | B2| * | 12/2002 | Pastwa et al.   | 200/61.27 |
| 6,557,386 | B2|   | 5/2003  | Donner et al.   |          |
| 6,583,373 | B2| * | 6/2003  | Ketzer et al.   | 200/61.54 |
| 6,921,872 | B2| * | 7/2005  | Rudolph et al.  | 200/61.54 |

(Continued)

FOREIGN PATENT DOCUMENTS

DE    19707067 C1    6/1998

(Continued)

*Primary Examiner*—Eric Culbreth
*Assistant Examiner*—Laura Freedman
(74) *Attorney, Agent, or Firm*—Brooks Kushman P.C.

(57) ABSTRACT

A steering column assembly for a steering column of a vehicle includes a steering column starting lock module, a functional module, and a support plate. The starting lock module has a lock element for fixedly connecting the steering column starting lock module to a steering column extending in an axial direction. The functional module has a guide groove extending in the axial direction. The starting lock module is connected to the support plate. The support plate is insertable along the axial direction into the guide groove of the functional module to connect with the functional module and thereby connect the functional module with the starting lock module such that the functional module is connected to the steering column via the starting lock module when the starting lock module is connected to the steering column.

15 Claims, 4 Drawing Sheets

U.S. PATENT DOCUMENTS

| | | | |
|---|---|---|---|
| 7,138,590 B2 * | 11/2006 | Mochizuki | 200/61.54 |
| 7,595,457 B2 * | 9/2009 | Heite et al. | 200/61.54 |
| 2002/0134610 A1 | 9/2002 | Pastwa et al. | |

FOREIGN PATENT DOCUMENTS

| | | |
|---|---|---|
| DE | 19711561 A1 | 9/1998 |
| DE | 19842225 A1 | 3/2000 |
| DE | 10319581 A1 | 11/2004 |
| EP | 1060946 A2 | 12/2000 |
| GB | 2363819 A | 1/2002 |

* cited by examiner

STEERING COLUMN ASSEMBLY

CROSS-REFERENCE TO RELATED APPLICATIONS

This application is a continuation of International Application PCT/EP2008/054939, published in German, with an international filing date of Apr. 23, 2008, which claims priority to DE 10 2007 019 493.7, filed Apr. 25, 2007; the disclosures of which are both hereby incorporated by reference.

BACKGROUND OF THE INVENTION

1. Field of the Invention

The present invention relates to a steering column assembly having interconnected functional modules including a steering column switch module and a steering column starting lock module in which the steering column assembly is attachable to a steering column via the starting lock module.

2. Background Art

EP 1 060 946 B1 describes a steering column assembly having interconnected functional modules including a steering column starting lock module. The functional modules are interconnected together by screws which connect the starting lock module with the other functional modules. The steering column assembly is attachable to a steering column via the starting lock module. A drawback of this steering column assembly is that individual accessibility of the functional modules is cumbersome for repairs or maintenance when the steering column assembly is attached to a steering column. As the screws holding the functional modules together are loosened, the steering column assembly comes apart into the individual functional modules and only the starting lock module remains in place as it is attached rigidly to the steering column. Accurately reassembling the functional modules and screwing them together with the screws to the starting lock module is also cumbersome.

SUMMARY OF THE INVENTION

An object of the present invention is a steering column assembly having interconnected functional modules including a steering column starting lock module in which the steering column assembly can be attached to a steering column with relatively little effort and can be removed, with the exception of the starting lock module, from the steering column with relatively little effort. The starting lock module is not easily removable from the steering column in order to prevent unauthorized manipulation of the starting lock module and its components such as steering starting and column locks.

Another object of the present invention is a steering column assembly having interconnected functional modules including a steering column starting lock module in which the steering column assembly can be pre-assembled as a single component in a simple and cost-effective manner for installment to a steering column via the starting lock module with the starting lock module being practically impossible to be removed from the steering column while the other functional modules are removable and replaceable with relatively little effort.

In carrying out the above objects and other objects, the present invention includes a steering column assembly for a steering column of a vehicle. The steering column assembly includes first and second functional modules and a support plate. The first functional module has a lock element for fixedly connecting the first functional module to a steering column extending in an axial direction. The second functional module has a guide groove extending in the axial direction. The first functional module is connected to the support plate. The support plate is insertable along the axial direction into the guide groove of the second functional module to connect with the second functional module and thereby connect the second functional module with the first functional module such that the second functional module is connected to the steering column via the first functional module when the first functional module is connected to the steering column.

After the support plate is connected with the second functional module, the support plate is removable along the axial direction from the guide groove of the second functional module to enable the second functional module to separate from the support plate and the first functional module and thereby separate from the steering column when the first functional module is connected to the steering column.

The first functional module may be a steering column starting lock module and the second functional module may be a steering column switch module.

Further, in carrying out the above objects and other objects, the present invention provides another steering column assembly for a steering column of a vehicle. This steering column assembly includes a steering column starting lock module, a functional module, and a support plate. The starting lock module has a lock element for fixedly connecting the starting lock module to a steering column extending in an axial direction. The functional module has a guide groove extending in the axial direction. The starting lock module is connected to the support plate. The support plate is insertable along the axial direction into the guide groove of the functional module to connect with the functional module and thereby connect the functional module with the starting lock module such that the functional module is connected to the steering column via the starting lock module when the starting lock module is connected to the steering column.

After the support plate is connected with the functional module, the support plate is removable along the axial direction from the guide groove of the functional module to enable the functional module to separate from the support plate and the starting lock module and thereby separate from the steering column when the starting lock module is connected to the steering column.

Also, in carrying out the above objects and other objects, the present invention provides another steering column assembly for a steering column of a vehicle. This steering column assembly includes first and second functional modules and a support plate. The first functional module has a lock element for fixedly connecting the first functional module to a steering column extending in an axial direction. One of the functional modules has a guide groove extending in the axial direction. The support plate is connected to the other one of the functional modules. The support plate is insertable along the axial direction into the guide groove of the one of the functional modules to connect with the one of the modules and thereby connect the other one of the functional modules with the one of the functional modules such that the second functional module is connected to the steering column via the first functional module when the first functional module is connected to the steering column.

The first functional module may be a steering column starting lock module and the second functional module may be a steering column switch module.

In embodiments of the present invention, a steering column assembly includes two or more functional modules and a support plate (i.e., a retaining plate). A first one of the functional modules is a steering column starting lock module. The starting lock module includes a lock element that is unreleasably attachable to a steering column in order to fixedly attach the starting lock module to the steering column. The starting lock module has the support plate or can be attached to the support plate. A second one of the functional module has guide grooves running essentially parallel to the axial direction of the steering column. The support plate is insertable into the guide grooves of the second functional module in order to connect the starting lock module and the second functional module. A releasable connection secures the support plate in the guide grooves after the support plate has slid into the guide grooves. The releasable connection can be advantageously designed as a screw connection.

The support plate, which is a part of or is attached to the starting lock module, establishes a connection between the starting lock module with the second and remaining functional modules. After the releasable connection securing the support plate to the second functional module is removed, the support plate enables a simple separation of the second and remaining functional modules from the starting lock module. Reassembly of the second and remaining functional modules with the starting lock module is likewise possible with little assembly effort.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
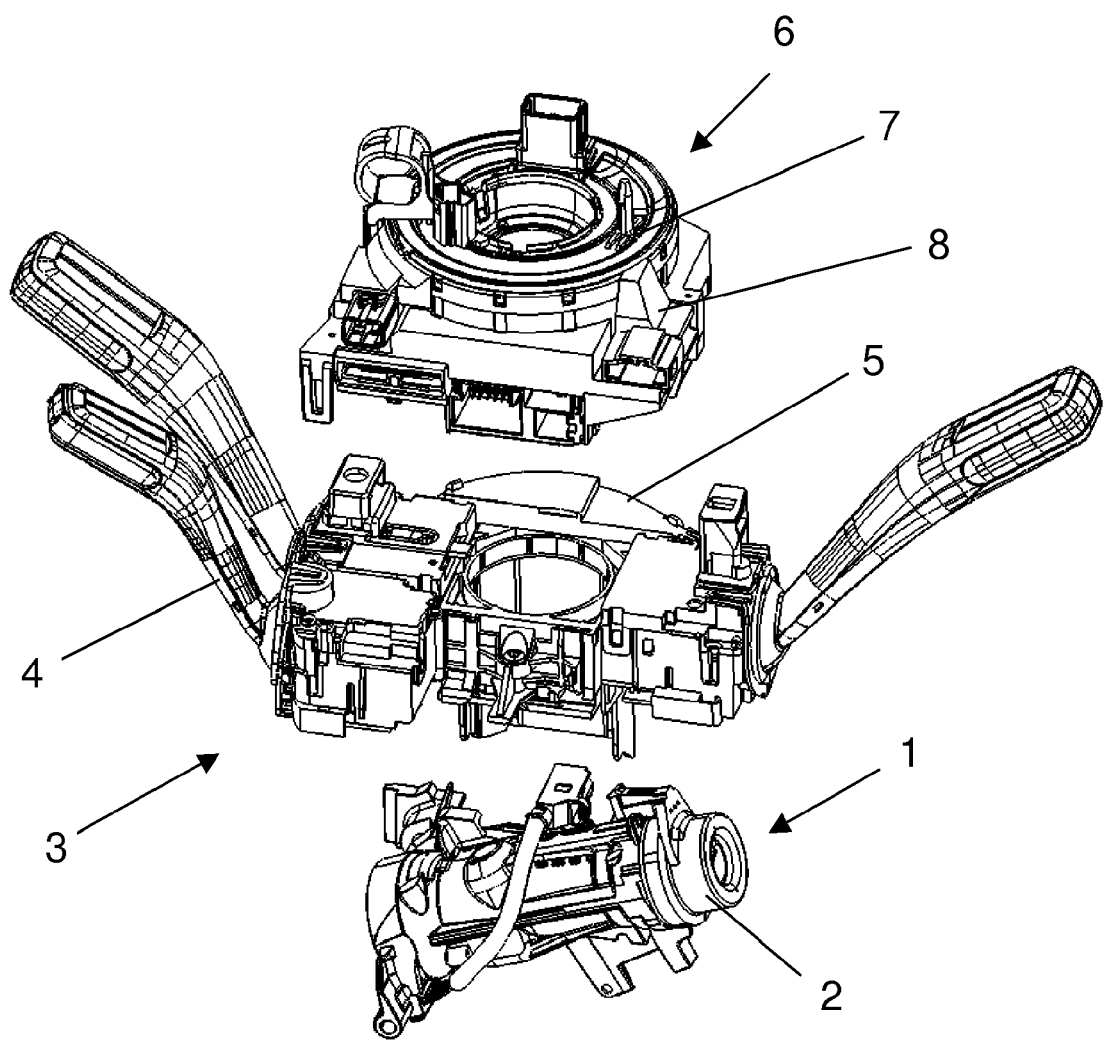
FIG. 1 illustrates an exploded view of a steering column assembly having a steering column starting lock module, a steering column switch module, and a steering column angle sensor module in accordance with an embodiment of the present invention.

Referring now to FIG. 1, an exploded view of a steering column assembly in accordance with an embodiment of the present invention is shown. The steering column assembly is to be installed to a steering column of a motor vehicle. The steering column assembly is to combine electrical and electronic components that are located in the region of a steering wheel connected to the steering column with one or more functional modules 1, 3, and 6 of the steering column assembly.

Functional module 1 is a steering column starting lock module 1. Functional module 3 is a steering column switch module 3 on which steering column switches 4 are movably mounted. Functional module 6 is a steering column angle sensor module 6.

Angle sensor module 6 enables an electronic detection of the steering angle of the steering wheel. Angle sensor module 6 includes a sensor housing 8 having a sensor for detecting the angular position of the steering wheel and electronics for evaluating the sensor signal. The connection of movable electrical components is achieved by a spiral flexible strip conductor, the so-called volute spring cassette 7, which is contained in a special housing. Sensor housing 8 together with volute spring cassette 7 forms angle sensor module 6 as a pre-assembled component.

Starting lock module 1 enables, in addition to the starting function of the vehicle engine, the locking of the steering column in place in order to protect against unauthorized use of the vehicle. As such, starting lock module 1 is a critical security component that should not be removable from the steering column without significant effort after the steering column assembly has been installed to the steering column. On the other hand, the remaining functional modules 3, 6 should be easily accessible and removable for periodic maintenance or repairs.

Figure 2:
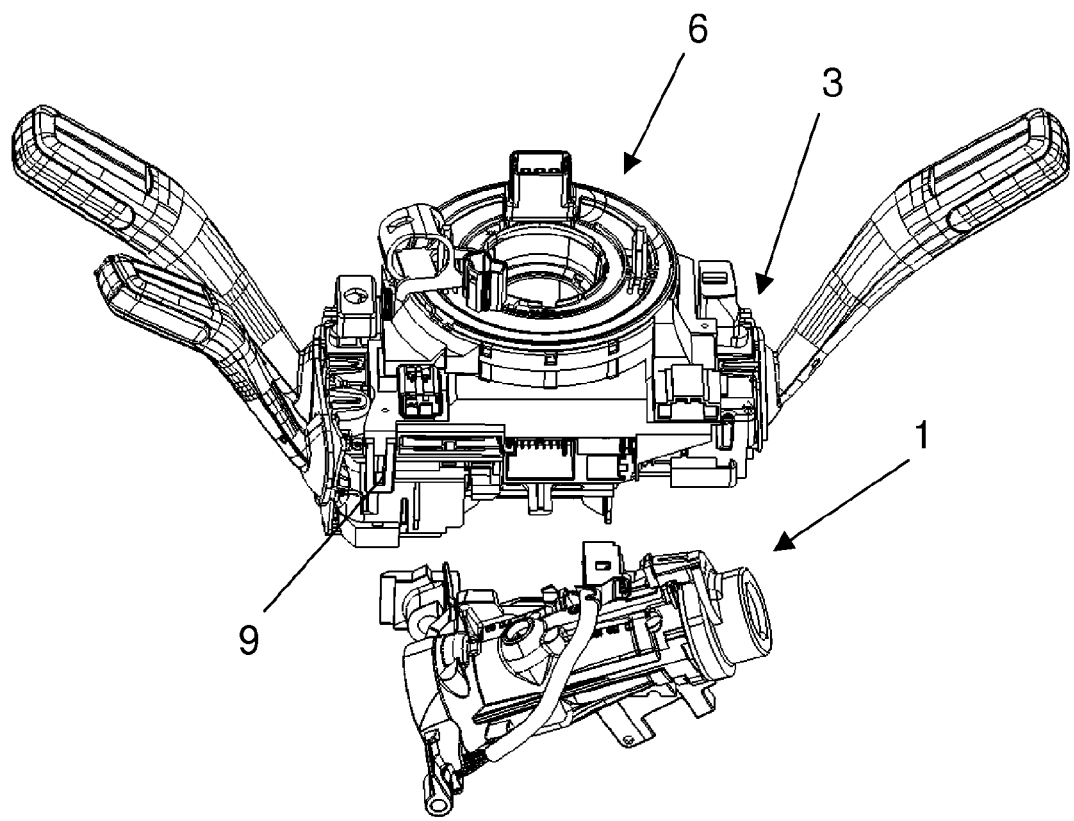
FIG. 2 illustrates the steering column assembly in which the angle sensor module is connected to the switch module.

Referring now to FIG. 2, with continual reference to FIG. 1, the steering column assembly is shown with angle sensor module 6 and switch module 3 being interconnected. Functional modules 1, 3, and 6 of the steering column assembly are designed such that they can be interconnected (i.e., mutually assembled) by simple latching connections. For instance, a latching connection 9 used to connect angle sensor module 6 and column switch module 3 together is shown in FIG. 2.

Figure 3:
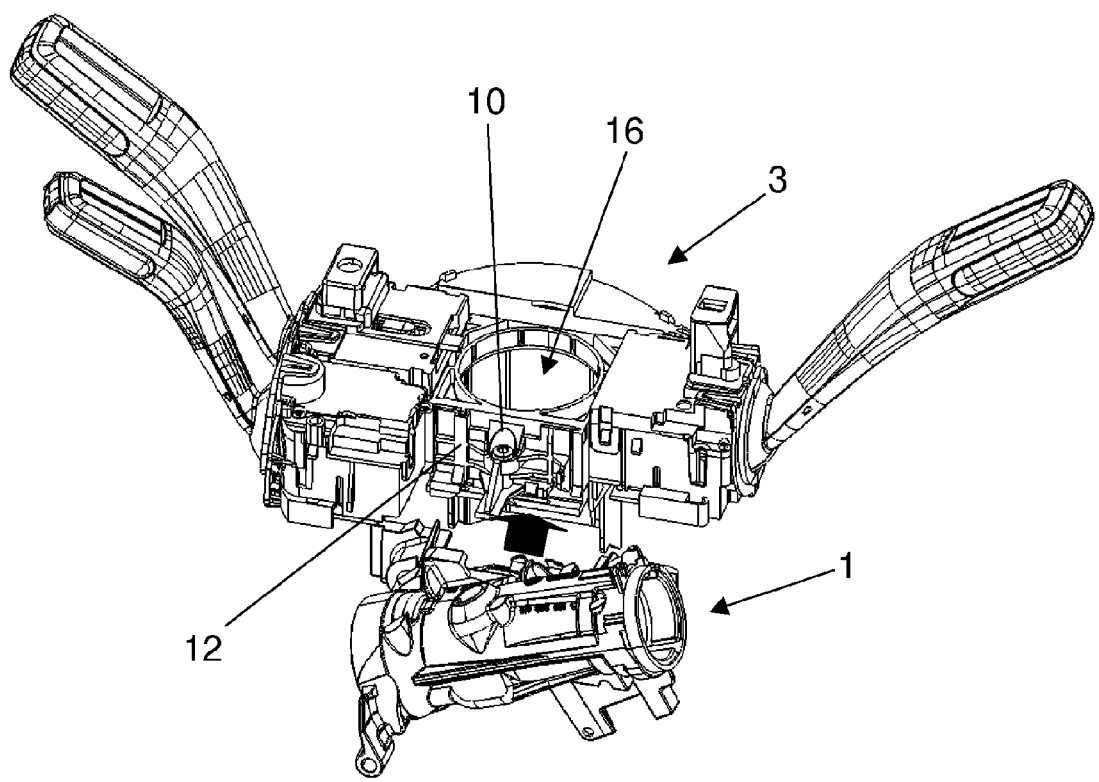
FIG. 3 illustrates the switch module and the starting lock module of the steering column assembly during the process of being connected together.

Referring now to FIG. 3, with continual reference to FIGS. 1 and 2, starting lock module 1 and switch module 3 during the process of being connected together is shown. Angle sensor module 6 connected to switch module 3 is not shown in FIG. 3 for clarification. As indicated by the arrow shown in FIG. 3, starting lock module 1 can be connected to a side of switch module 3. The connecting direction of starting lock module 1 onto switch module 3 is in an approximately radial direction with respect to a steering column which is to extend through a circular aperture 16 of the steering column assembly.

The steering column assembly includes a support plate 12 (i.e., a retaining plate) which is used to connect starting lock module 1 to switch module 3. On the one hand, support plate 12 is removably connectable to switch module 3. On the other hand, latching elements on starting lock module 1 latch with suitably shaped latching elements and guiding geometries on support plate 12 to connect starting lock module 1 with support plate 12. In turn, support plate 12 is connected to switch module 3 to thereby connect starting lock module 1 with switch module 3. The latching connection provided by support plate 12 between starting lock module 1 and switch module 3 is mechanically stable as the attachment of the entire steering column assembly to the steering column takes place exclusively through starting lock module 1.

Installation of the assembled steering column assembly in a vehicle occurs by inserting the free end of a steering column through aperture 16 of the steering column assembly and the final placement of the steering column assembly on the steering column. Subsequently, a lock element 2 of starting lock module 1 is connected to the steering column by break-away screws. The break-away screws are then broken off with the application of tension at a designated break-point. Lock element 2 (and thereby starting lock module 1) can then no longer be removed from the steering column at least without a special tool.

As starting lock module 1 is fixedly connected to the steering column and supports the steering column assembly, a problem arises when the other functional modules 3 and 6, which are interconnected with starting lock module 1, have to be removed from being a part of the steering column assembly for such purposes as replacement or maintenance.

Because the steering column passes through functional modules 3 and 6, functional modules 3 and 6 can only be removed from the steering column along the axial direction extending parallel with the steering column. However, axial movement of functional modules 3 and 6 (in particular, axial movement of switch module 3 to which angle sensor module 6 is connected) will be hindered by any latching connection directly between starting lock module 1 and switch module 3 that acts essentially in a radial direction with respect to the steering column. This is because a latching connection cannot generally be separated perpendicular to the latching direction (i.e., a latching connection cannot generally be separated along an axial direction perpendicular to a radial latching direction).

Figure 4:
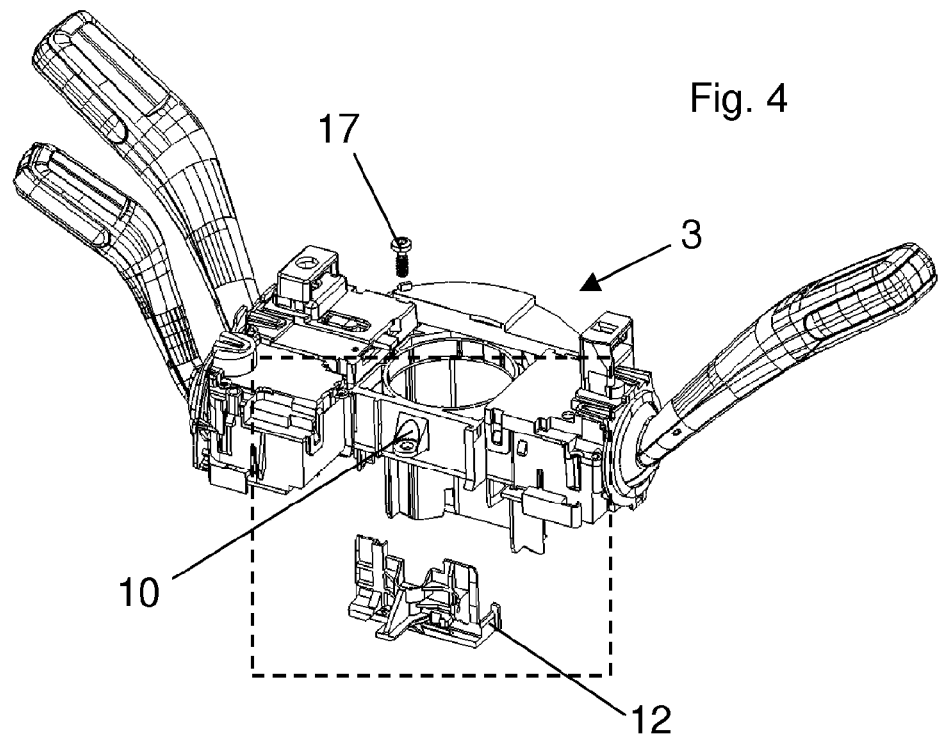
FIG. 4 illustrates the switch module and a support plate of the steering column assembly.
Figure 5:
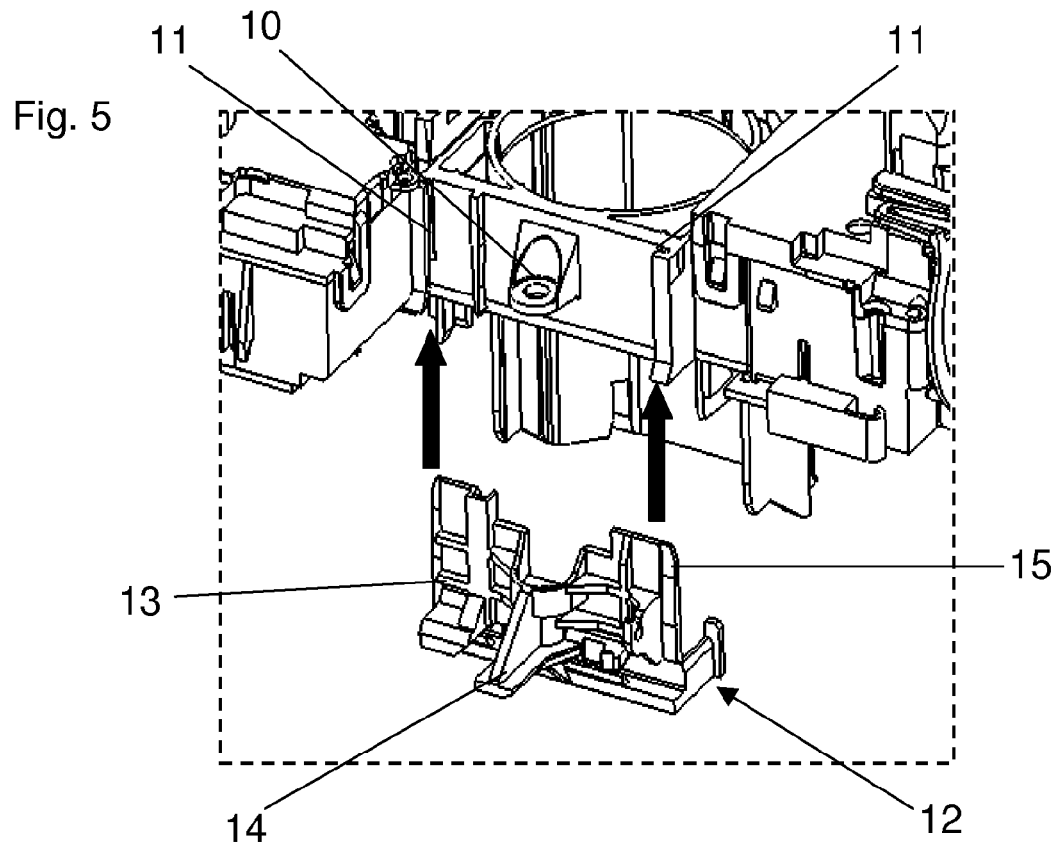
FIG. 5 illustrates an enlarged section of FIG. 4.

Referring now to FIGS. 4 and 5, with continual reference to FIGS. 1, 2, and 3, switch module 3 and support plate 12 of the steering column assembly are shown. In general, support plate 12 solves the problem associated with a latching connection generally not being separable perpendicular to a latching direction as support plate 12 mediates the latching connection between starting lock module 1 and switch module 3. To this end, on the one hand, support plate 12 is connected to or is a part of starting lock module 1. On the other hand, support plate 12 is connectable by a sliding connection with switch module 3.

To enable the sliding connection with support plate 12, switch module 3 includes a pair of guide grooves 11. A pair of edge sections 15 of support plate 12 can slide into guide grooves 11 of switch module 3 to connect support plate 12 (and thereby starting lock module 1) with switch module 3. The direction of the sliding connection between switch module 3 and support plate 12 runs essentially parallel to the axial direction of the steering column. As a result, the connection between starting lock module 1 and switch module 3 via support plate 12 extends essentially parallel to the axial direction of the steering column as opposed to extending radially with respect to the steering column.

In order to secure the sliding connection between support plate 12 and switch module 3, switch module 3 includes a screw plate 10. A screw 17 is passed through screw plate 10 and screwed to support plate 12 to fixedly connect support plate 12 to switch module 3 when support plate 12 and switch module 3 are slidingly connected. Support plate 12 can be fixedly connected to switch module 3 by a releaseable connection different than that provided by screw 17 such as a snap-on connection on switch module 3. Ribs 13 formed on support plate 12 stiffen support plate 12 and thereby assure additional stability. Support plate 12 further includes a web-shaped recess 14 by which support plate 12 supports starting lock module 1.

When the steering column assembly is installed to a steering column, switch module 3 (and any other functional modules other than starting lock module 1 connected to switch module 3 such as angle sensor module 6) can be removed from the steering column in the axial direction after the screw connection between support plate 12 and switch module 3 is removed. Support plate 12 thus remains latched with starting lock module 1 and starting lock module 1 remains fixedly connected to the steering column via lock element 2. Reassembly of the steering column assembly is just as easy in that switch module 3 is placed over support plate 12 and secured in support plate 12 by once again screwing in screw 17.

If an additional functional module is connected with switch module 3, such as angle sensor module 6, screw plate 10 opening between support plate 12 and switch module 3 can also more advantageously be oriented radially with respect to the steering column axis, which is different than that depicted in FIGS. 4 and 5. As a result, switch module 3 and angle sensor module 6 can be removed together from support plate 12 after loosening screw 17 without requiring that latching connection 9 therebetween first be released. The two functional modules 3, 6 can similarly be remounted in the connected state.

The effort required for assembly, disassembly, and reassembly of the steering column assembly is thus small, which assures that starting lock module 1 can be built into the vehicle along with other functional modules, but is practically impossible to disassemble after installation.

Different variants can be conceived for the arrangement and selection of functional modules in accordance with the present invention. In particular, additional functional modules can be provided as mutually latchable components of a steering column assembly. Also, in a kinematic reversal of the illustrated embodiment, support plate 12 can be located on switch module 3 with a corresponding sliding connection to starting lock module 1.

REFERENCE NUMBERS

1 Steering column starting lock module
2 Lock element
3 Steering column switch module
4 Steering column switch
5 Steering column switch module housing
6 Steering angle sensor module
7 Volute spring cassette
8 Sensor housing
9 Latching connection
10 Screw plate
11 Guide grooves
12 Support plate
13 Ribs
14 Web-shaped recesses
15 Edge sections
16 Aperture
17 Screw While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A steering column assembly for a steering column of a vehicle, the steering column assembly comprising:
    a first functional module having a lock element for fixedly connecting the first functional module to a steering column extending along an axial axis;
    a second functional module having a plate-like body which includes a pair of laterally spaced apart guide grooves extending along the axial axis and includes a connector receiver positioned between the guide grooves and aligned along the axial axis; and
    a support plate fixedly connected to the first functional module irrespective of whether the first and second functional modules are connected together;
    wherein the support plate is slidingly movable against the plate-like body in a first axial direction along the axial axis to insert into the guide grooves and thereby connect the first and second functional modules together whereby the second functional module is connected to the steering column via the first functional module when the first functional module is connected to the steering column;

wherein the support plate is slidingly movable against the plate-like body in a second opposite axial direction along the axial axis to eject out from the guide grooves and thereby disconnect the first and second functional modules from one another whereby the second functional module is disconnected from the steering column when the first functional module is connected to the steering column;

wherein when the support plate is inserted into the guide grooves and a connector inserted through the connector receiver is directly connected to the support plate the support plate is unable to move and until the connector is directly connected to the support plate the support plate is slidingly movable against the plate-like body in either of the first or second axial directions.

2. The steering column assembly of claim 1 wherein:
the first functional module is a steering column starting lock module.

3. The steering column assembly of claim 2 wherein:
the second functional module is a steering column switch module.

4. A steering column assembly for a steering column of a vehicle, the steering column assembly comprising:
  a steering column starting lock module having a lock element for fixedly connecting the steering column starting lock module to a steering column extending along an axial axis;
  a functional module having a plate-like body which includes a pair of laterally spaced apart guide grooves extending along the axial axis and includes a connector receiver positioned between the guide grooves and aligned along the axial axis; and
  a support plate fixedly connected to the steering column starting lock module irrespective of whether the modules are connected together;
  wherein the support plate is axial direction slidingly movable against the plate-like body in a first axial direction along the axial axis to insert into the guide grooves and thereby connect the functional module with the steering column starting lock module whereby the functional module is connected to the steering column via the steering column starting lock module when the steering column starting lock module is connected to the steering column;
  wherein the support plate is slidingly movable against the plate-like body in a second opposite axial direction along the axial axis to eject out from the guide grooves and thereby disconnect the functional module from the steering column startling lock module whereby the functional module is disconnected from the steering column when the steering column starting lock module is connected to the steering column;
  wherein when the support plate is inserted into the guide grooves and a connector inserted through the connector receiver is directly connected to the support plate the support plate is unable to move and until the connector is directly connected to the support plate the support plate is slidingly movable against the plate-like body in either of the first or second axial directions.

5. The steering column assembly of claim 4 wherein:
the connector is a screw.

6. The steering column assembly of claim 4 wherein the functional module is a first functional module, the steering column assembly further comprising:
  a second functional module connected to the first functional module.

7. The steering column assembly of claim 6 wherein:
the first functional module is a steering column switch module and the second functional module is a steering column angle sensor module.

8. The steering column assembly of claim 7 wherein:
the steering column angle sensor module includes a volute spring cassette.

9. The steering column assembly of claim 4 wherein:
the lock element of the steering column starting lock module is attachable by a non-releasable connection to the steering column.

10. The steering column assembly of claim 9 wherein:
the non-releasable connection is produced by break-away screws.

11. The steering column assembly of claim 4 wherein:
the support plate has molded web-shaped recesses.

12. The steering column assembly of claim 4 wherein:
the lock element has recesses that support the steering column starting lock module in an assembled state of the steering column assembly.

13. A steering column assembly for a steering column of a vehicle, the steering column assembly comprising:
  a first functional module having a lock element for fixedly connecting the first functional module to a steering column extending along an axial axis;
  a second functional module; and
  a support plate;
  wherein one of the functional modules has a plate-like body which includes a pair of laterally spaced apart guide grooves extending along the axial axis and includes a connector receiver positioned between the guide grooves and aligned along the axial axis;
  wherein the support plate is fixedly connected to the other one of the functional modules irrespective of whether the functional modules are connected together;
  wherein the support plate is slidingly movable against the plate-like body in a first axial direction along the axial axis to insert into the guide grooves and thereby connect the functional modules together whereby the second functional module is connected to the steering column via the first functional module when the first functional module is connected to the steering column;
  wherein the support plate is slidingly movable against the plate-like body in a second opposite axial direction along the axial axis to eject out from the guide grooves and thereby disconnect the functional modules from one another whereby the second functional module is disconnected from the steering column when the first functional module is connected to the steering column;
  wherein when the support plate is inserted into the guide grooves and a connector inserted through the connector receiver is directly connected to the support plate the support plate is unable to move and until the connector is directly connected to the support plate the support plate is slidingly movable against the plate-like body in either of the first or second axial directions.

14. The steering column assembly of claim 13 wherein:
the first functional module is a steering column starting lock module.

15. The steering column assembly of claim 14 wherein:
the second functional module is a steering column switch module.

* * * * *